United States Patent Office 3,531,853
Patented Oct. 6, 1970

3,531,853
METHOD OF MAKING A CERAMIC-TO-METAL SEAL
Johannes Theodorus Klomp, Emmasingel, Eindhoven, Netherlands, assignor, by mesne assignments, to U.S. Philips Corporation, New York, N.Y., a corporation of Delaware
Filed Nov. 8, 1967, Ser. No. 681,473
Claims priority, application Netherlands, Nov. 30, 1966, 6616835
Int. Cl. B23k *31/02*
U.S. Cl. 29—472.9       3 Claims

ABSTRACT OF THE DISCLOSURE

A method of forming a hermetic ceramic-to-metal seal in which a metal body is clamped between two ceramic bodies and heated in a dry hydrogen atmosphere.

---

Figures 1, 2:
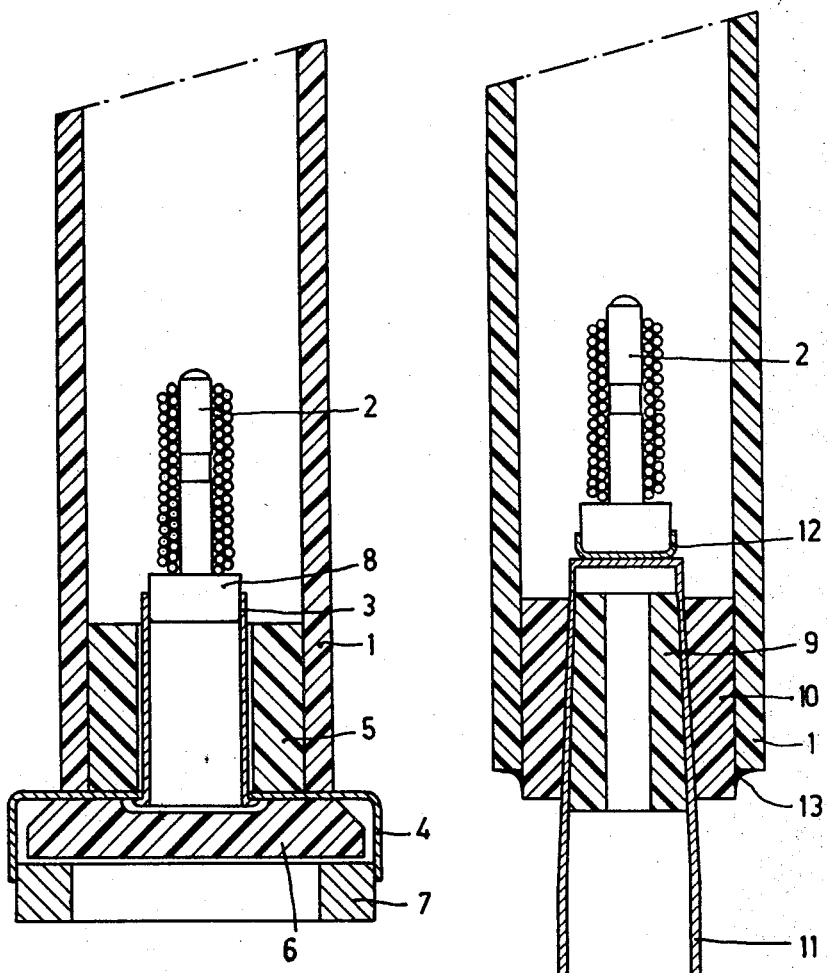

The invention relates to a method of making a ceramic-to-metal seal, particularly an alkali-vapor resistant hermetic ceramic-to-metal seal.

Several methods of establishing a vacuum tight joint between metal articles and ceramic materials are known. In the methods most frequently used, the ceramic material is first coated with a metal layer to which the metal article may be soldered. However, these methods are circuitous and hence expensive.

It is also known to join an iron alloy to a ceramic material consisting of magnesium silicate (soap stone, steatite) by heating the article in an oxidizing atmosphere. The oxide layer forming on the article ensures a satisfactory adhesion to the ceramic material.

However, such oxides often cause the joint to be weakened and may be attacked, for example, by metal vapors in discharge tubes, so that the joint becomes leaky. Moreover, the oxide layer must not be unduly thick so that the extent of oxidation must be accurately controlled. For this purpose, the oxidizing atmosphere may consist of moist hydrogen gas.

A very simple method of establishing a vacuum tight joint between metal articles and ceramic materials is obtained if, according to the invention, the metal article is clamped between two or more ceramic parts and is heated in a dry hydrogen atmosphere until the metal has directly adhered to the ceramic material.

It has been found that the joint may then have a greater strength than the ceramic material itself. The pressure which must be exerted on the metal article by the ceramic parts is not critical but must lie below approximately 150 kg./sq. cm. Above approximately 150 kgs/.sq. cm., the metal and/or the ceramic material are liable to be deformed.

The most suitable metals are platinum, iron, nickel and cobalt. When the method is used for manufacturing lead-through conductors for discharge tubes, in general the conductors used will consist at their surface of one of the said metals, but their core consists of an alloy the coefficient of thermal expansion of which is adapted to that of the ceramic material. For example, a current supply conductor consisting at its surface of pure iron and having a core of an iron-nickel-cobalt alloy has proved particularly suitable to be secured by this method in a vacuum tight manner in pure alumina. This lead-through connection is particularly suitable, for example, for high pressure sodium vapor lamps. The heating temperature required for obtaining the joint between metal and ceramic material may be 90% of the melting temperature of the metal. In this case, neither the metal nor the ceramic material is deformed. The heating time generally lies between approximately 2 and 30 minutes.

The invention will now be described more fully with reference to the drawing, in which:

FIG. 1 is a sectional view of part of a discharge tube filled with a metal vapor, and FIG. 2 is a sectional view of another embodiment of such a discharge tube.

In the figures, reference numeral 1 denotes the envelope of translucent pure alumina of a discharge tube operating with sodium vapor at high pressure. The electrode 2 is secured by a thickened part 8 in a cylinder 3 consisting of molybdenum or iron.

The cylinder 3 is secured to a plate 4 which at least at its surface consists of iron and which serves as a lead-through member.

Cylinder 3 is surrounded by a cylinder 5 which, like a disc 6, consists of $Al_2O_3$ and is joined in a vacuum-tight manner to the metal disc 4 by heating it at a pressure of 15 kgs./sq. cm. to 1375° C. in a dry hydrogen atmosphere for 20 minutes. The bent-over edge of the disc 4 is secured to a molybdenum ring 7 (FIG. 1). Consequently, the cylinder 3 is first joined to the metal disc 4, for example, by welding, whereupon the disc 4 is joined in a vacuum-tight manner to the parts 5 and 6 of $Al_2O_3$ by heating it at high pressure in dry hydrogen. The electrode 2 is then secured by the thickened part 8 in the cylinder 3 and the envelope 1 is provided and is joined to the plate 4, as the case may be also by heating it under compression in dry hydrogen. Advantageously, all the parts may be assembled beforehand and the cylinder 5 as well as the disc 6 and the envelope 1 may be joined in a vacuum-tight manner to the plate 4 by a single thermal treatment.

In FIG. 2, the disc 4 of FIG. 1 has been omitted and the cylinder 11 supporting the electrode 2 directly extends to the outside. The pressure required for joining the parts 9 and 10 of $Al_2O_3$ to the cylinder 11 is obtained by a conical shape of the parts 9, 10 and of the cylinder 11. After the parts 9, 10 and the cylinder 11 have been joined in a vacuum-tight manner by heating in dry hydrogen as described above, a hood 12 on which the electrode 2 is secured is joined to the upper end of the cylinder 11 and the envelope 1 is joined to the body 10 by means of a vitreous substance 13. The body 9 and the cylinder 11 may serve as exhaust tube. Also in this case, the assembly shown forms part of a high-pressure sodium-vapor lamp.

By the method described, a satisfactory vacuum-tight joint is established in a simple manner without intermediate oxide layers being formed and without the parts being deformed.

While the invention has been described with reference to specific embodiments and applications, other modifications will be apparent to those skilled in this art without departing from the spirit and scope of the invention as defined in the appended claims.

What is claimed is:

1. A method of establishing a vacuum-tight joint between a metal article at least the surface of which is a metal selected from the group consisting of platinum, iron, cobalt and nickel and ceramic materials in which the metal article is clamped between at least two ceramic parts and is heated in a dry hydrogen atmosphere until the metal has directly adhered to the ceramic material.

2. A method as claimed in claim 1 in which the pressure at which the metal article is clamped between the ceramic part is below 150 kgs./sq. cm.

3. A method as claimed in claim 1 in which the heating temperature is 90% of the melting temperature of the metal.

References Cited

UNITED STATES PATENTS

| | | | |
|---|---|---|---|
| 2,776,472 | 1/1957 | Mesick | 29—473.1 |
| 2,903,788 | 9/1959 | Pryslak | 29—473.1 |
| 3,091,028 | 5/1963 | Westbrook et al. | 29—473.1 |
| 2,564,738 | 8/1951 | Tank | 29—472.9 |
| 3,201,863 | 8/1965 | Sayre | 29—472.3 |

JOHN F. CAMPBELL, Primary Examiner

R. J. SHORE, Assistant Examiner

U.S. Cl. X.R.

29—471.3, 471.9, 472.3